Fig. 1.

April 19, 1927.  F. E. BOARDMAN  1,625,073
APPARATUS FOR CONTROLLING ELEVATORS
Filed April 15, 1922  5 Sheets-Sheet 2

Inventor
Frank E. Boardman

By
Attorney

April 19, 1927.  F. E. BOARDMAN  1,625,073
APPARATUS FOR CONTROLLING ELEVATORS
Filed April 15, 1922  5 Sheets-Sheet 3

Inventor
Frank E. Boardman
By
Attorney

April 19, 1927.  1,625,073
F. E. BOARDMAN
APPARATUS FOR CONTROLLING ELEVATORS
Filed April 15, 1922    5 Sheets-Sheet 4

Fig. 11.

Inventor
Frank E. Boardman
By
Attorney

Patented Apr. 19, 1927.

1,625,073

UNITED STATES PATENT OFFICE.

FRANK E. BOARDMAN, OF MEMPHIS, TENNESSEE, ASSIGNOR OF ONE-HALF TO PLEASANT P. WILLIAMS, OF MEMPHIS, TENNESSEE.

APPARATUS FOR CONTROLLING ELEVATORS.

Application filed April 15, 1922. Serial No. 553,025.

This invention relates to an apparatus for regulating the trips of elevators relatively to each other, when there are a large number of elevators to be controlled, and has for its object to provide a means which will be simple in construction and more efficient in action than those heretofore proposed.

With these and other objects in view, the invention consists in the novel parts and combinations of parts constituting the apparatus, all as will be more fully hereinafter disclosed and particularly pointed out in the claims.

Referring to the accompanying drawings forming a part of this specification, in which like numerals designate like parts in all the views:

Figure 3 is an end elevational view of the parts shown in Figure 2;

In order that the invention may be the more clearly understood it is said:

As is well known, when a building is equipped with a plurality of elevators, it is very desirable to regulate with convenience and celerity the schedules of the elevators in service, and the times at which each elevator will leave the bottom and top floors, and to this end according to this invention the elevators are started at regular intervals from signals which are displayed automatically at a station in the building and also on each car.

In this invention, there is disclosed two timing mechanisms designed to control the up and down trips of from one to nine elevators, and each comprises a schedule carriage which can be set for a given number of elevators to be run on the particular time intervals that are selected.

Figure 1:
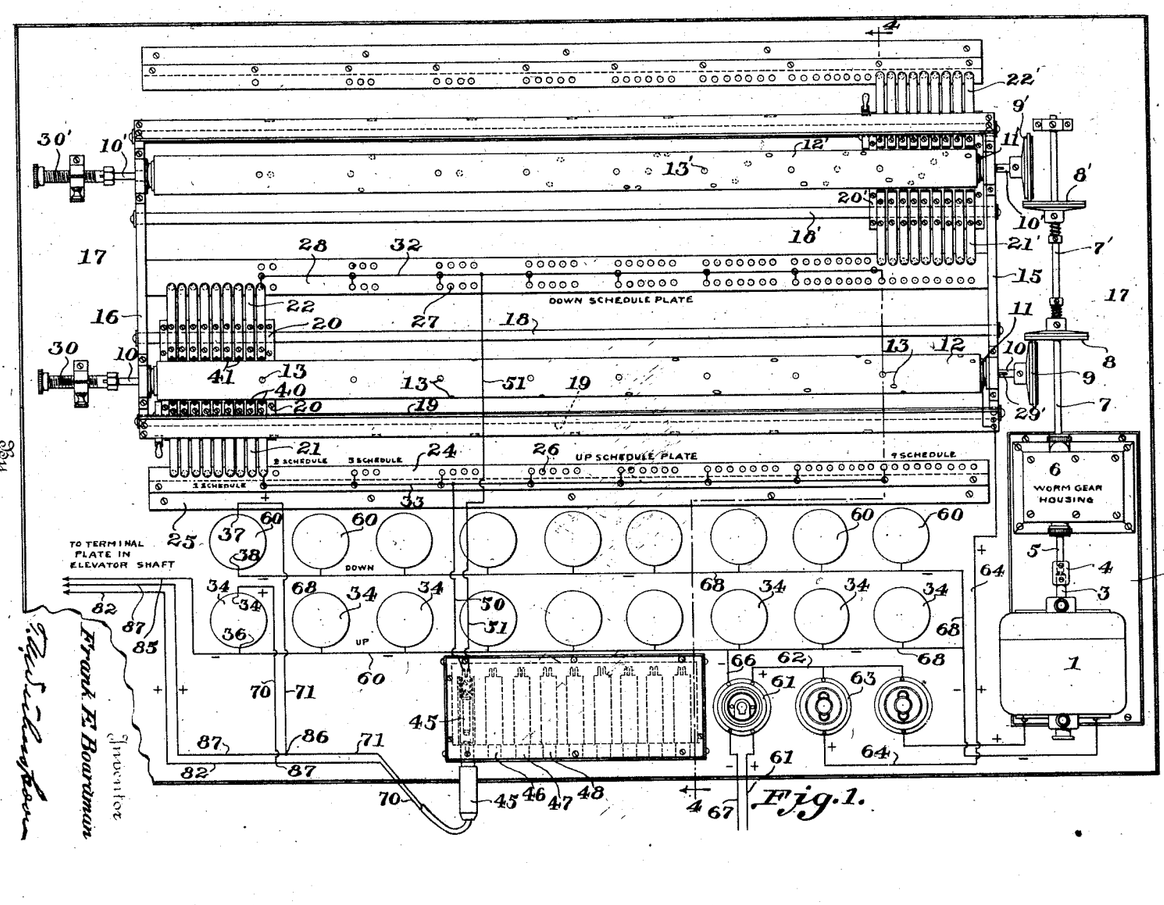
Figure 1 is a diagrammatic plan view of a portion of an apparatus made in accordance with this invention.
Figure 2:
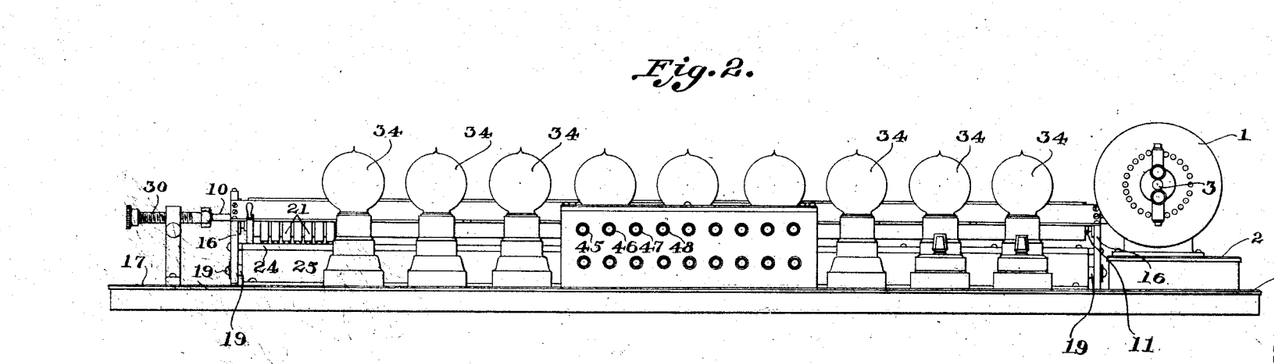
Figure 2 is a side elevational view of the parts shown in Figure 1.
Figures 4, 5, 6, 7, 8, 9, 10:
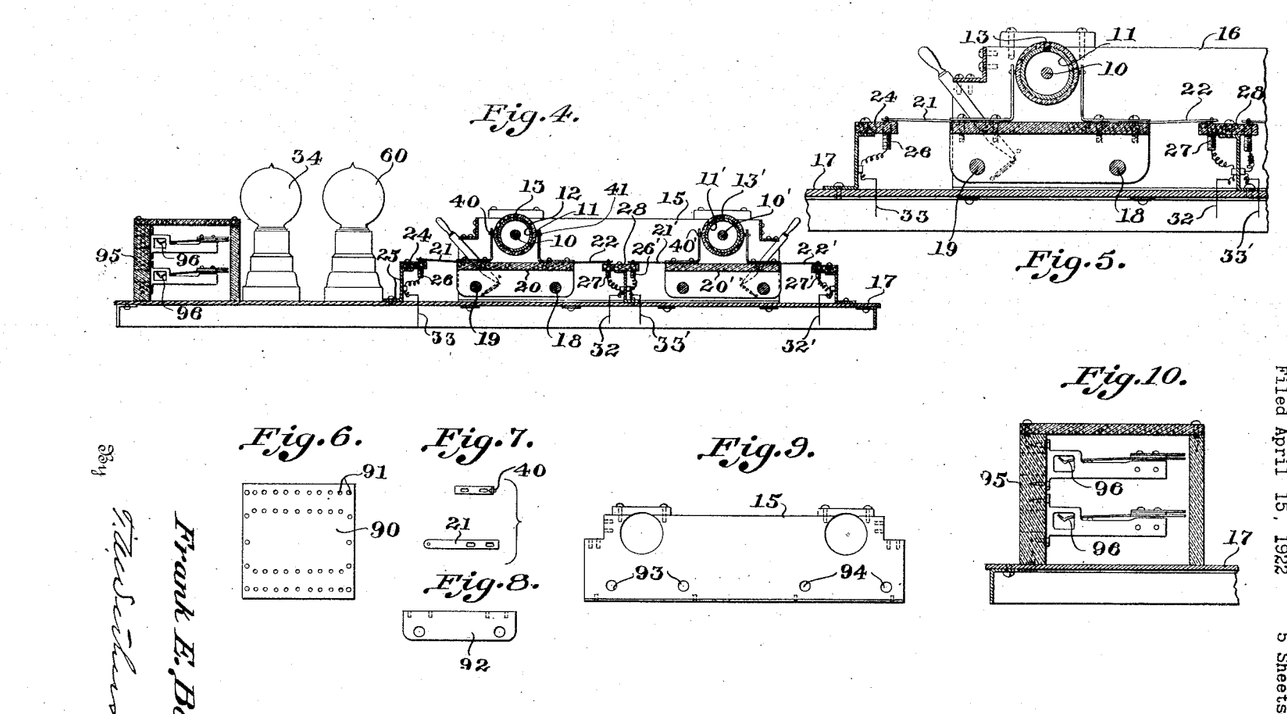
Figure 4 is a sectional view taken on the line 4—4 of Figure 1, looking in the direction of the arrows.
Figure 5 is an enlarged sectional view of a portion of the parts shown in the lower left hand corner of Figure 1.
Figure 6 is a plan view of a fiber plate of the schedule carriage.
Figure 7 is a plan view of the contacts 21 and 40.
Figure 8 is a side elevational view of the vertical plate of the schedule carriage which rides over the rods 18 and 19.
Figure 9 is a view of the supporting plate 15 which supports the cylinders 11 and 11' and their co-acting parts.
Figure 10 is a sectional view through the box in which the jacks are located.
Figure 5:
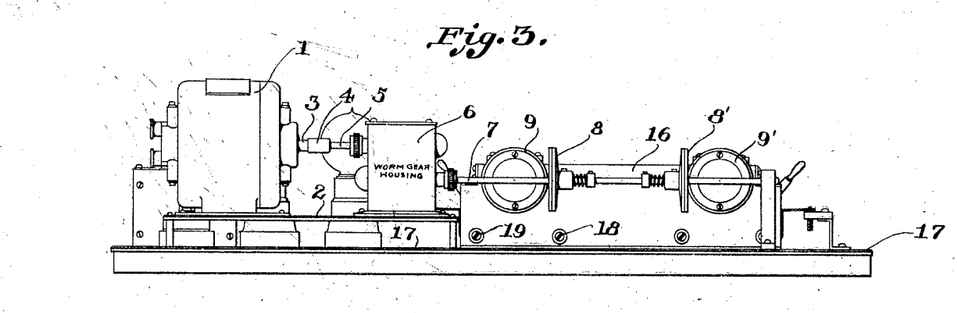
Figure 11:
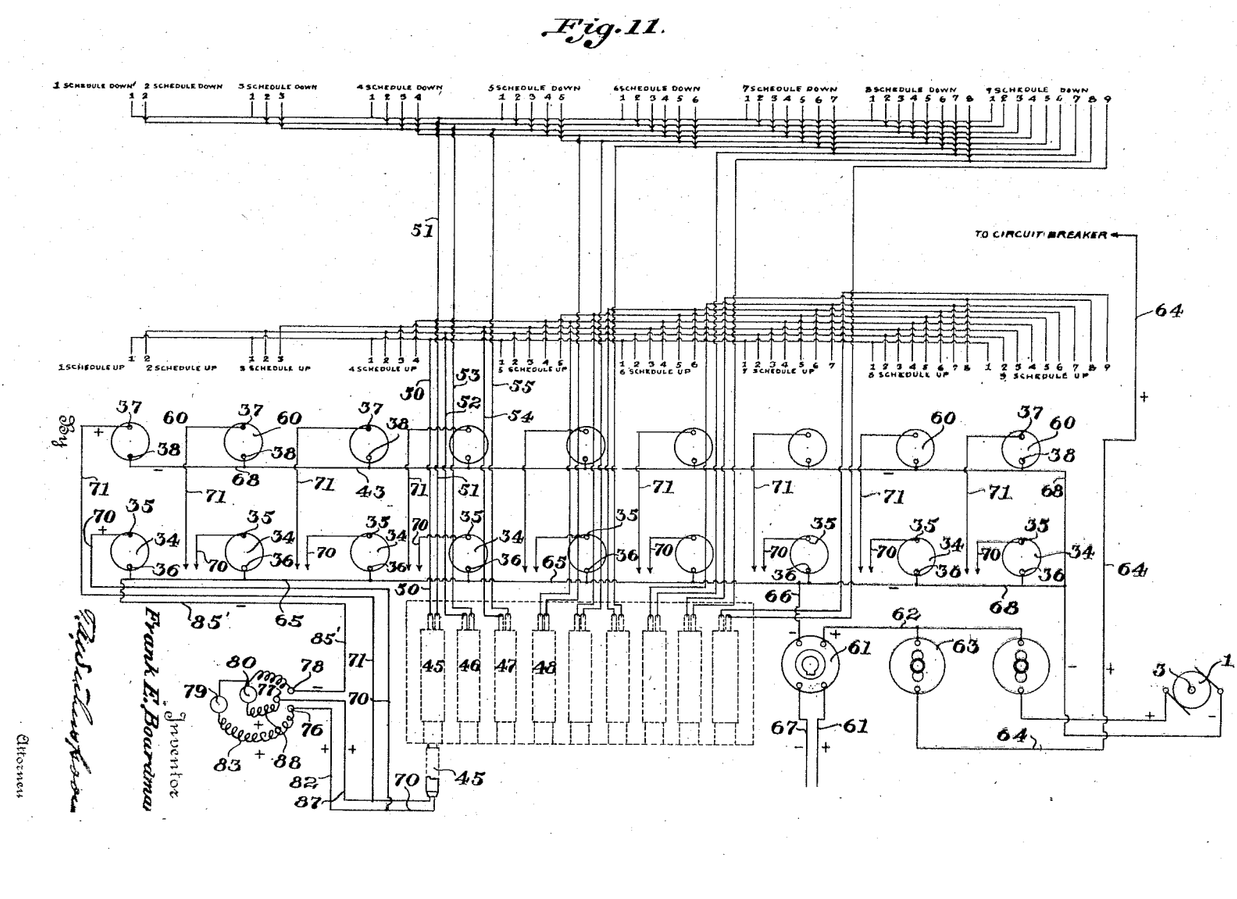
Figure 11 is a diagrammatic view illustrating the circuits involved in this apparatus.

Referring more particularly to Figures 1 and 4, 1 indicates a motor mounted on a base 2; 3 indicates the shaft of said motor; 4 a coupling joining the shaft 3 with the shaft 5 of a worm gear located in the housing 6 from which leads a shaft 7 carrying a friction disk 8 adapted to engage and rotate the disk 9 mounted on the shaft 10 supporting the metal cylinder 11 carrying the fiber insulating cylinder 12, through which project the metal conducting pins 13, all as will be clear from the drawings. 15 and 16 indicate supporting or bearing plates located near the ends of shaft 10, which in turn are secured to the bottom plate 17 on which the entire apparatus located at the operating station rests. 18 and 19, best shown in Figure 4, are a pair of guide rods supported in the plates 15 and 16 on which rods slides the schedule or contact carriage 20 provided with the two sets of contacts 21 and 22. As the contact or schedule carriage 20 is slid along the rods 18 and 19 from left to right as seen in Figure 1 its set of nine contacts 21 will slide over the various contacts 26. These said contacts 26 are divided into groups or schedules, as shown, and each group contains a contact corresponding to an elevator that is to be controlled by the carriage 20 when operated on a particular schedule. That is, schedule 1, as indicated in Figures 1 and 11, applies to only a single elevator, and has only one contact for each of the up and down trips. Schedule 2 applies to two elevators, and therefore has two up contacts and two down contacts. Schedule 3 applies to three elevators and has three up contacts and three down contacts, etc. It is to be understood that after the particular schedule is selected, or the number of cars to be operated is determined, the carriage 20 is slid manually along the guide rods 18 and 19 to that particular schedule. The carriage is thus left in this position until such time as a new schedule is to be selected. The various contacts for the up trip are lettered 26, and are supported as best shown in Figure 4 by the plate 24 carried by the flanged plate 25. From the various contacts 26 leads the wire 33. In the same way, the down contacts for each schedule are collectively numbered 27, they are carried by the plate 28 supported on the flanged plate 29 and from said contacts 27 leads the wire 32.

Figure 12:
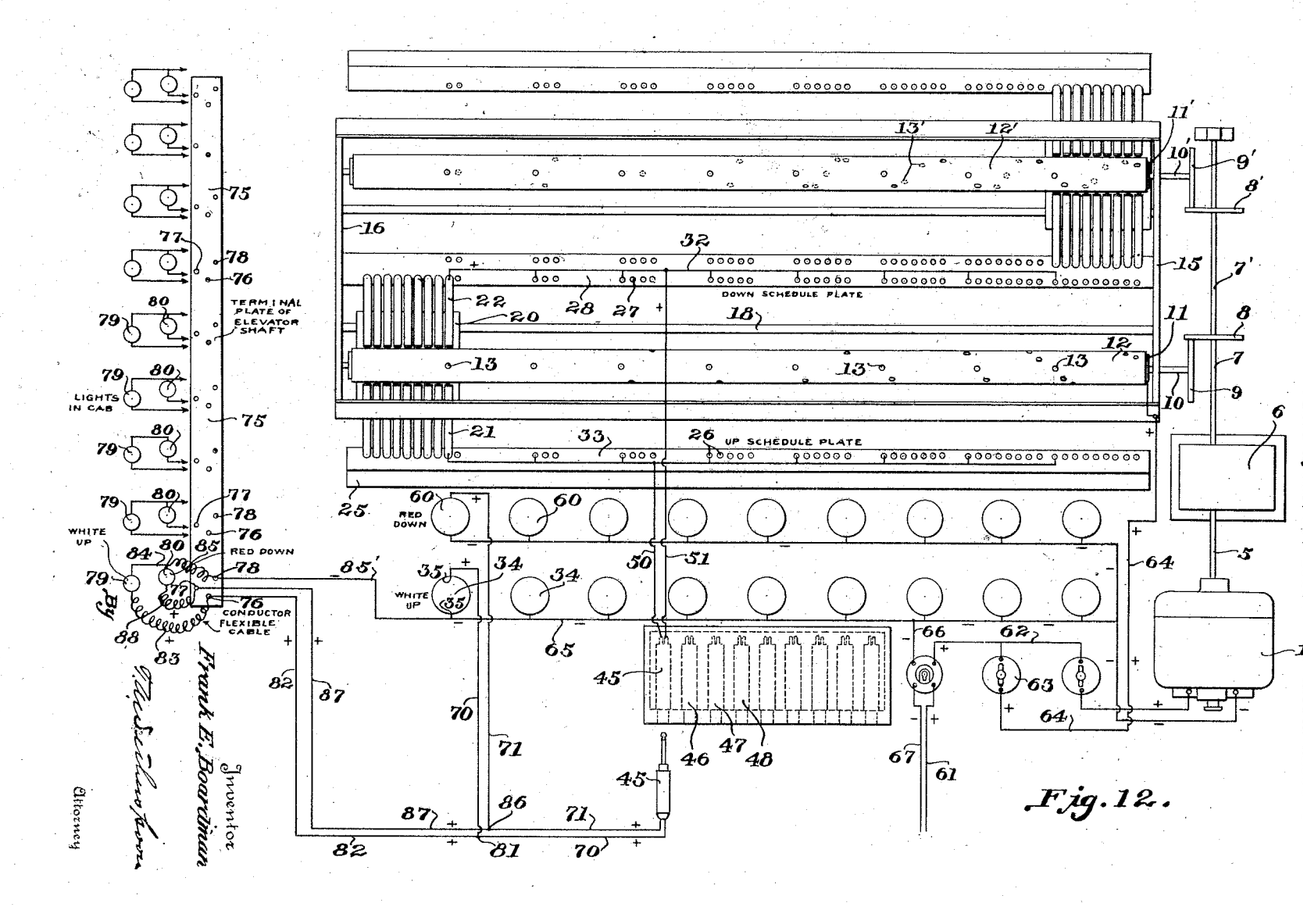
Figure 12 is a view similar to Figure 1, but showing diagrammatically at its left hand end the arrangements of the signals on the cars themselves.

It will therefore be clear that as the carriage 20 is slid along the rods 18 and 20 from left to right, as seen in Figures 1 and 12, the up contacts 21 of said carriage will make electrical connection with the various contacts 26 carried by the plate 24, while the down contacts 22 of said carriage will make electrical connection with the down contacts 27 carried by the plate 28, but as there are nine each of the contacts 21 and 22, all of said contacts 21 and 22 will not make electrical connections except in the last schedule containing nine contacts 26 and nine contacts 27.

It will further be seen that the contacts 13 carried by the metal cylinder 11 are spirally disposed and increase in number from the left hand of Figure 1 to the right thereof, and they further increase in proportion to the number of elevators or signals it is required to operate in each schedule. Further, the shaft 10 is slotted as at 29', Figure 1, in order that it may slide relatively to the cylinder 11 and it is provided with the screw adjusting means 30 by which it may move the disk 9 toward and from the shaft 7 and thus decrease or increase the speed at which the disk 8 drives said cylinder 11 and contacts 13. By this disposition of parts one is enabled to change the intervals between the up and down signals by changing the speed with which the contacts 13 make circuit with the sets of contacts 21 and 22 on the carriage 20.

Referring more particularly to Figures 11 and 12, the nine pairs of wires 70 and 71 indicate connections respectively to up and down signals that are located at the operating station. That is, the nine wires 70 convey current to nine white lamps 34, one corresponding to each car and which white lamps are lit when the cars of that particular schedule are to leave the bottom floor on their upward trips. The nine wires 71 likewise convey current to nine red lamps 60, one for each car, and which indicate when cars of each schedule are to begin their downward trips. On each car there is likewise a white light 79 and a red light 80 corresponding to the white lights 34 and red lights 60 just described, all as will appear more fully hereinafter.

The connections for the white lamps 34 are indicated at 35 and 36 and the connections for the red lamps 60 are indicated at 37 and 38.

Each of the contacts in the set of contacts 21 carries a contact 40, see Figures 1 and 4, which is adapted to make circuit with one of the contacts 13 for the up trip and each of the contacts in the set of contacts 22 carries a contact 41 adapted to make circuit with its appropriate contact 13 for the down trip.

Referring now more particularly to Figures 1, 11 and 12, current may be derived from a service connection 61, whence it passes over the wire 62 through the switch 63 to the wire 64, to the metal cylinders 11 and contacts 13. If the up trip is being had, the current will pass from the contacts 13 to the contacts 40 of the set of contacts 21, and from said contacts 21 to the contacts 26 of the appropriate schedule for which the carriage 20 has been set.

In Figure 1 there is only one contact 26 in the schedule selected, and therefore current will pass from the contact 26 of said schedule 1 to the wire 33. From the wire 33 the current will pass by way of the wire 50 to the jack 45, through said jack and to the wire 70, through the contacts 35 and 36 of the white light 34 corresponding to the particular schedule selected, thence along the wire 65 to the wire 66, through the switch 61, and wire 67, back to the original source.

Thus will the white light corresponding to schedule 1 be lit upon placing the jack 45 corresponding to said schedule in its operative position. In the same way, the jack 45 being pushed in as indicated in Figure 1, current will pass from the contact 13 of schedule 1 on the down trip through the appropriate contact 41 carried by the group of contacts 22, through the appropriate individual contact 22 to the particular contact 27 of schedule 1, to the wire 32, from the wire 32 to the wire 51, through the jack 45 to the wire 71, from the wire 71 through the contacts 37, and 38, through the lamp 60, and from said lamp to the wire 68, thence along said wire 68, to the wire 66, and original source of current 67. Thus will the red light 60 corresponding to the first schedule and to jack 45 be lit when the car of schedule 1 begins its down trip.

As will be obvious from the description just given, should the carriage 20 be moved toward the right as shown in Figure 1, to enter another schedule, such as schedule 2. a like operation of parts and a like flow of current will take place upon the placing of the plugs in jacks 45 and 46. Should more cars be required in service, such for example as four cars, the carriage 20 would be moved further to the right until the contacts 26 of schedule 4 were engaged by the proper contacts 21 of the carriage, whereupon a like flow of current will take place upon the placing of the plugs in the four jacks 45, 46, 47 and 48.

In other words, all the operator has to do when he is operating any desired number of cars is to place plugs in the corresponding jacks, it being understood, of course, that for each car there is a corresponding jack. When the necessary jack connections are made, then the white and red lamps will be flashed at the proper time intervals, by the rotation of the contact cylinder 12, to indicate the proper time of starting each individual car upon its up or down trip.

Now, it is also desirable, as above stated, to light a white light on each car itself when its up trip is to begin and a red light on each car when its down trip is to begin, in order that the operator of each car may know when to start his up and down trips.

To accomplish this result, there is located, say, half way up the elevator shaft, a terminal plate 75, which is diagrammatically illustrated at the left hand end of Figure 12. This terminal plate is provided with three contacts for each car, which contacts are lettered 76, 77, and 78, all as will now be disclosed. Further, there is provided on each car a white light 79 and a red light 80. Joined to the wire 70 of each jack, as at the point 81, is a wire 82, which is joined to the contact 76 on the terminal plate for the car controlled by said jack. Leading from said terminal plate contact 76 is a flexible wire 83 which connects the lamp 79 on the car with said wire 82 and said wire 70. Leading from the white lamp 79 is the wire 84 which is joined to the flexible wire or cable 85 which leads to the stationary contact 78 on the terminal plate, and leading from the said terminal plate contact 78 is the wire 85' which joins with the terminal 36 of the white lamp at the operating station. In the same way, the wire 71 of each jack at the point 86 is connected with a wire 87 which leads to the contact 77 on the terminal plate for the car controlled by said jack, and there is a flexible wire or cable 88 connecting the terminal 77 for each car with the red lamp 80 carried by the car, and said lamp 80 is connected as indicated with the flexible cable 85, the return stationary contact 78, and return wire 85', which in its turn is connected with the common return wire 65 of the white lamps 34 located at the stationary operating station.

Of course, it will be understood, as above intimated, that similar connections are made for each of the white lamps 79 on the cars, and for each of the red lamps 80 carried by the cars, and that said similar connections are joined to the respective controlling jacks such as 46, 47, 48, etc.

It has been shown that when a plurality of elevators, such for example as four cars, are desired in service the carriage 20 is slid over to the four car schedule position and the first four jack plugs 45, 46, 47 and 48 placed in operative position. Thereupon, as the cylinder 12 revolves the contact points carried thereby will make momentary contact with the appropriate contacts carried by the carriage 20 and establish the flow of current necessary to flash the lamps 34 and 60 at the operating station. It therefore follows that when this flow of current takes place, the points corresponding to the point 81 in Figure 12 will feed current through the contact 76 on the terminal plate 75 through the flexible cable 83 of the particular car governed, through the white lamp 79 on the said car, and by the connections 84, 85, 78 and 85' back to the source of current; thus lighting the white lamp 79 on the car simultaneously with the lighting of the white lamp 34 at the operating station.

In similar manner will the red lamp on each car be flashed simultaneously with the corresponding red lamp at the operating station. That is to say, the current necessary to flash the red lamp 60 will divide at one of the points 86, see Figure 12, passing over the wire 87 to contact point 77 on the terminal plate 75, through the flexible conductor 88, through the red lamp 80 on the car and return through the connections 85, 78 and 85' to the source of current. In other words, the lamps in each car are connected in parallel circuit with their corresponding lamps at the operating station.

From the foregoing, it will now be understood that the time of a half revolution of the cylinder 11 will measure the time each elevator in each schedule is to take in making an up trip or a down trip. That is to say, if the screw 30 is operated to adjust the disk 9, the speed with which the cylinder 10 rotates will be changed, and therefore the intervals allotted to each elevator to make an up or a down trip may be readily changed.

When it is desired to operate two cars on a schedule, the carriage 20 is slid over to the two car schedule and both the jacks 45 and 46 brought into operative position, whereupon the wires 50 and 52 will be controlled on the up trip and the wires 51 and 53 will be controlled on the down trip, all as indicated above. When it is desired to operate three elevators the carriage 20 is slid over to schedule number 3, and jacks numbered 45, 46 and 47 will be brought into place, whereupon the wires 50, 52, and 54 will be controlled on the up trip and the wires 51, 53 and 55 will be controlled on the down trip.

From the foregoing it is evident that the schedule carriage 20 and its co-acting parts may be duplicated, and in the upper portions of Figures 1 and 12, and on the right hand side of Figure 4, I have indicated such a duplication. That is to say, the shaft 7 has been extended to provide the shaft 7'; the disk 8 has been duplicated in the disk 8'; the disk 9 has been duplicated in the disk 9'; the cylinder 11 has been duplicated in the cylinder 11'; and each of the co-acting parts described above have been duplicated with a corresponding number, primed.

The result is, if we should carry out the completed wiring (which is not done in order to save confusion in the drawings), we would join up a second operating carriage 20' in multiple with the operating carriage 20, and we would have a duplicate of the mechanism just described in all its parts. Now, suppose such a duplicate schedule controlling apparatus be provided, it is evident that we could, by properly placing the jacks 45, 46, and 47, etc., run all nine elevators associated with the cylinder 11, as local elevators, and we could run nine other elevators associated with cylinder 11' as express elevators. Or, one could, in a twenty story building, for example, run five elevators to the tenth floor in connection with cylinder 11, and say, four elevators to the 20th floor with the aid of cylinder 11'. Or various other combinations of elevators could be readily provided.

In fact, it would be a simple matter to provide five express and five local elevators wherein every other car would operate as an express car and every other car would operate as a local car. That is to say, cars having odd numbers could be connected up to operate as express cars, and cars having even numbers could be operated as local cars.

Or, if this system were operating in a building, say, 15 stories high, and one wished a set of elevators that operated to the fifth floor only, and another set that operated to the tenth floor only, and a third set to the 15th floor only, it would only be necessary to have three sets of jacks and three sets of cylinders such as 11 and 11' with their co-operating parts, all of which would be a simple matter by extending the device as indicated in Figure 1.

Another advantage of this system resides in the fact that should one be operating say five cars, only, of a bank of more than five elevators and should anything happen to one of said five cars, such as car No. 3, this particular car could be switched out of the schedule and one of the idle cars be switched into said schedule without interfering with the operation of the other four cars. This is accomplished by simply removing from its socket the plug such as 47 controlling car No. 3 and inserting in its stead a plug identified with and controlling one of the idle cars, such for example, as car No. 6. Thereupon, as the cylinder revolves, signals will be flashed as heretofore in cars No. 1, No. 2, No. 4 and No. 5 and at the same time intervals, and signals will be flashed in car No. 6 and its corresponding lamps at the operating station, instead of in the disabled car No. 3 and its corresponding station lamps. In other words, by this substitution of plugs car No. 6 will receive its signals between the signals given to car No. 2 and car No. 4, and, as five cars are still being operated, it will not be necessary to change the position of the carriage 20. Of course, any one of the idle cars could be utilized in place of the disabled car by the above substitution of the controlling plug.

In Figure 6 I have illustrated a convenient form of fiber plate 90 provided with holes 91 for securing the contact strips 21 and 40 illustrated in Figure 7 and with which the schedule carriage is provided.

In Figure 8 I have illustrated the form of strip 92 best suited to support the schedule carriage and to ride over the rods 18 and 19.

In Figure 9 I have shown an elevational view of the supporting plate 15 which supports one end of the cylinders 11 and 11', and which is provided with the holes 93 for the rods 18 and 19 and with similar holes 94 for the similar rods that are provided for the similar rods 18 and 19.

In Figure 10 I have indicated a box 95 adapted to support the contact members 96 of the jacks.

It will now be clear that the foregoing construction constitutes an elevator control for a plurality of cars; that the sliding schedule carriage 20 and its coacting parts including the sets of contacts 26, 27, etc., constitute means to automatically make signals of predetermined intervals on each of said cars; that the period of time between the intervals may be controlled by the speed of rotation of the cylinder 11; and that this speed may be varied at will by an attendant. It will also be clear that when it is desired to include one or more additional cars in the group to be controlled, it is only necessary while the other cars are running and while the car controlling means is still operating, to slide the carriage 20 along the cylinder 11 until its contact fingers 21 and 22 make circuit with that particular set or group of stationary contacts 26, 27, etc., which will include the desired cars in their circuits. A movement of said carriage 20 in the opposite direction will, of course, cut out one or more cars from the group being controlled.

It is obvious that those skilled in the art may vary the details of construction as well as the arrangement of parts without departing from the spirit of the invention and therefore I do not wish to be limited to the above disclosure except as may be required by the claims.

What I claim is:

1. An elevator signaling system for controlling a plurality of elevators in accordance with a plurality of predetermined schedules comprising a plurality of signals, a circuit for each signal, means for energizing said signal circuits including movable contact means having a plurality of groups of contacts, one group for each schedule and the number of contacts in each group differing from the number of contacts in any other group, the contacts of each group being spaced in the direction of motion of said movable contact means; time controlled means for moving said movable contact means, stationary contact means comprising a contact for each of said signals and means movable relatively to said movable contact means for connecting the contacts of any one of said groups of contacts in circuit with selected contacts of said stationary contact means corresponding to the selected number of cars to be controlled.

2. An elevator control system for controlling a plurality of elevators in accordance with a plurality of predetermined schedules, comprising a plurality of signals, a circuit for each signal, a movable contact maker and breaker with a plurality of contacts carried thereby grouped into independent groups, each group having a different number of contacts from the other groups with the contacts of a group stepped in the direction of motion of the movable contact maker and breaker, time controlled means for moving said movable contact maker and breaker, a plurality of normally stationary contacts to which said signal circuits connect, and means movable relatively to the time controlled contact maker and breaker which when properly located will bring into cooperative relation only the contacts belonging to a predetermined group as the time control contact maker and breaker moves to successively close the circuits to the signals of the predetermined group.

3. An elevator signaling system for controlling a plurality of elevators in accordance with a plurality of schedules comprising a signal for each car, a circuit for each signal, means for energizing said signal circuits including movable contact means having a plurality of groups of contacts, the number of contacts in each group differing from the number of contacts in any other group, the contacts of each group spaced in the direction of motion of said movable contact means, time controlled means for moving said movable contact means, stationary contact means comprising a contact for each of said signals, means movable relatively to said movable contact means for connecting the contacts of any one of said groups of contacts in circuit with selected contacts of said stationary contact means corresponding to the selected number of cars to be controlled, and means for selectively connecting any of said signal circuits to said selected contacts.

4. In an elevator signaling system for controlling a plurality of elevators in accordance with a plurality of predetermined schedules comprising an up and a down signal on each car and corresponding stationary up and down signals, a circuit for each signal, means for energizing said signal circuits, including movable contact means having a plurality of groups of contacts, one group for each schedule and the number of contacts in each group differing from the number of contacts in any other group, the contacts of each group being spaced in the direction of motion of said movable contact means, time controlled means for moving said movable contact means, stationary contact means comprising a contact for each of said signals, and means movable relatively to said movable contact means for connecting the contacts of any one of said groups of contacts in circuit with selected contacts of said stationary contact means corresponding to the selected number of cars to be controlled.

5. An elevator control system to control the schedule of a plurality of cars in accordance with a plurality of predetermined schedules comprising a signal for each car, a circuit for each signal, a movable contact carrier movable in one direction and carrying a plurality of contacts separated into independent groups each group containing a different number of contacts, the contacts in each group being arranged on the carrier, one in advance of the other in the direction of its movement, time controlled means for moving said movable contact carrier, means for changing the speed of operation of the time controlled contact carrier, a plurality of normally stationary contacts to which said signal circuits connect, and means movable relatively to said movable contact means for connecting the contacts of any one of said groups of contacts in circuit with selected contacts of said stationary contact means corresponding to the selected number of cars to be controlled.

6. An elevator control system for a plurality of cars comprising a plurality of signals, a circuit for each signal with make and break devices therein including two contact carriers, one contact carrier being movable in one direction with reference to the other carrier, time controlled means for so moving said carrier, one carrier carrying a plurality of independent groups of contacts with a different number of contacts in each group, the contacts on said last mentioned carrier being spaced in the direction of the time controlled movement in accordance with the schedule desired, the other contact carrier carrying a set of normally stationary contacts and one contact carrier being movable in a direction other than the time controlled movement of the other carrier to bring its contacts into cooperation with any selected one of the groups of contacts of the other contact carrier whereby the number of signals to be operated by any group and the time period between their respective operations is determined by the relative location of one carrier to the other.

7. In an elevator signaling system for controlling a plurality of elevators in accordance with a plurality of schedules comprising a signal for each car; a circuit for each signal, means for energizing said signal circuits including movable contact means having a plurality of groups of contacts the number of contacts in each group differing from the number of contacts in any other group, the contacts of each group spaced in the direction of motion of said movable contact means; stationary contact means comprising a contact for each of said signals, means movable relatively to said movable contact means for connecting the contacts of any one of said groups of contacts in circuit with selected contacts of said stationary contact means corresponding to the selected number of cars to be controlled; and means for selectively connecting any of said signal circuits to said selected contacts while said signals are being made.

8. An elevator signaling system for controlling a plurality of elevators in accordance with a plurality of schedules comprising a signal for each car; a circuit for each signal; means for energizing said signal circuits including movable contact means having a plurality of groups of contacts, the number of contacts in each group differing from the number of contacts in any other group, the contacts of each group spaced in the direction of motion of said movable contact means; time controlled means for moving said movable contact means; stationary contact means comprising a contact for each of said signals; means movable relatively to said movable contact means for connecting the contacts of any one of said groups of contacts in circuit with selected contacts of said stationary contact means corresponding to the selected number of cars to be controlled; and means comprising a plug and jack connection for selectively connecting any of said signal circuits to said selected contacts.

9. An elevator signaling system for controlling a plurality of elevators in accordance with a plurality of schedules comprising a signal for each car; a circuit for each signal; means for energizing said signal circuits including movable contact means having a plurality of groups of contacts, the number of contacts in each group differing from the number of contacts in any other group, the contacts of each group spaced in the direction of motion of said movable contact means; time controlled means for moving said movable contact means; stationary contact means comprising a contact for each of said signals; means movable relatively to said movable contact means for connecting the contacts of any one of said groups of contacts in circuit with selected contacts of said stationary contact means corresponding to the selected number of cars to be controlled; and interchangeable means for selectively connecting any of said signal circuits to said selected contacts.

10. An elevator signaling system for controlling a plurality of elevators in accordance with a plurality of predetermined schedules comprising a plurality of signals; a circuit for each signal; means for energizing said signal circuits including a time controlled contact carrier having a plurality of groups of contacts, each group having a different number of contacts therein to provide said schedules, a plurality of groups of stationary contacts corresponding to the groups of time controlled carrier contacts; and a second carrier carrying a plurality of normally stationary contacts, but movable to various positions relatively to the time controlled contact carrier and said stationary contacts to bring its contacts into cooperative relation with any one of the groups of contacts on the time controlled carrier and its corresponding group of stationary contacts.

11. An elevator control system for controlling a plurality of elevators in accordance with a plurality of predetermined schedules, comprising a plurality of signals; a circuit for each signal; a movable contact maker and breaker comprising a drum with a plurality of contacts carried thereby grouped into independent groups, each group having a different number of contacts from the other groups with the contacts of a group stepped in the direction of motion of the movable contact maker and breaker; time controlled means for moving said movable contact maker and breaker; a plurality of normally stationary contacts to which said signal circuits connect; and means movable relatively to the time controlled contact maker and breaker which when properly located will bring into cooperative relation only the contacts belonging to a predetermined group as the time control contact maker and breaker moves to successively close the circuits to the signals of the predetermined group.

12. An elevator control system for controlling a plurality of elevators in accordance with a plurality of predetermined schedules, comprising a plurality of signals; a circuit for each signal; a movable contact maker and breaker with a plurality of electrically connected contacts carried thereby grouped into independent groups, each group having a different number of contacts from the other groups with the contacts of a group stepped in the direction of motion of the movable contact maker and breaker; time controlled means for moving said movable contact maker and breaker; a plurality of normally stationary contacts to which said signal circuits connect; and means movable relatively to the time controlled contact maker and breaker which when properly located will bring into cooperative relation only the contacts belonging to a predetermined group as the time control contact maker and breaker moves to successively close the circuits to the signals of the predetermined group.

13. In a despatching system for a bank of elevators, a plurality of cars, a signal for each car, a circuit for each signal and means for successively closing the circuits to any selected number of said cars in any selected order at predetermined equal time intervals.

14. In a despatching system for a bank of elevators, a plurality of cars, a signal for each car, a circuit for each signal, and means for successively closing the circuits to any selected number of said cars in any selected order at predetermined equal time intervals, including two relatively movable members, one of said members carrying a plurality of groups of contacts, each group comprising a different number of contacts, the contacts of each group being spaced in the direction of the movement between said members, and time controlled means for causing relative movement between said members.

15. In a despatching system for a bank of elevators, a plurality of cars, a signal for each car, a circuit for each signal, and means for successively closing the circuits to any selected number of said cars at predetermined equal time intervals including two relatively movable members, one of said members carrying a plurality of groups of contacts, each group comprising a different number of contacts and the contacts of each group being spaced in the direction of the movement between said members, and time controlled means for causing relative movement between said members.

In testimony whereof I affix my signature.

FRANK E. BOARDMAN.